United States Patent [19]

Fabris et al.

[11] Patent Number: 4,768,694
[45] Date of Patent: Sep. 6, 1988

[54] CONNECTING ROD FRACTURE MACHINE

[75] Inventors: Alroy G. Fabris, Mount Clemens; Mohamed A. Fetouh, Troy, both of Mich.; Charles E. Frost, Cincinnati, Ohio; Frederick A. Hekman, Grosse Pointe Woods, Mich.; Antoni J. Malarz, Troy, Mich.; Gerald C. Rieck, Sterling Heights, Mich.

[73] Assignee: General Motors Corporation, Detroit, Mich.

[21] Appl. No.: 85,686

[22] Filed: Aug. 17, 1987

[51] Int. Cl.⁴ ............................................. B23P 17/02
[52] U.S. Cl. .................................. 225/94; 29/156.5 A; 225/93.5; 225/100; 225/103
[58] Field of Search ............... 225/1, 2, 93.5, 94, 225/100, 103; 29/156.5 A, 413; 74/579 E

[56] References Cited

U.S. PATENT DOCUMENTS

| | | |
|---|---|---|
| 2,703,263 | 3/1955 | Zernov . |
| 3,285,098 | 11/1966 | Beveridge . |
| 3,818,577 | 6/1974 | Bailey et al. . |
| 3,845,895 | 11/1974 | Nakahara .......................... 225/93.5 |
| 3,994,054 | 11/1976 | Cuddon-Fletcher et al. . |
| 4,255,216 | 3/1981 | Conant et al. .................. 225/93.5 X |
| 4,569,109 | 2/1986 | Fetouh . |
| 4,693,139 | 9/1987 | Mukai et al. .............. 29/156.5 A X |

Primary Examiner—Frank T. Yost
Attorney, Agent, or Firm—Robert J. Outland

[57] ABSTRACT

A connecting rod fracture machine for fracture separating the caps and bodies of integrally formed connecting rod workpieces includes a cryogenic cooling station for embrittling the large ends, a fracture station for fracture separation of the embrittled cap and body portions, a warming station for returning fractured assemblies to ambient temperature and transfer mechanism for moving the workpieces between stations. The fracture station includes separable pilots for receiving the large end bores of the pieces to be fractured, an impact separation ram for rapidly separating the pilots to effect fracture separation and anti-rotation clamp means movable with the respective pilots and requiring linear separating motions of the caps from the connecting rod bodies.

7 Claims, 5 Drawing Sheets

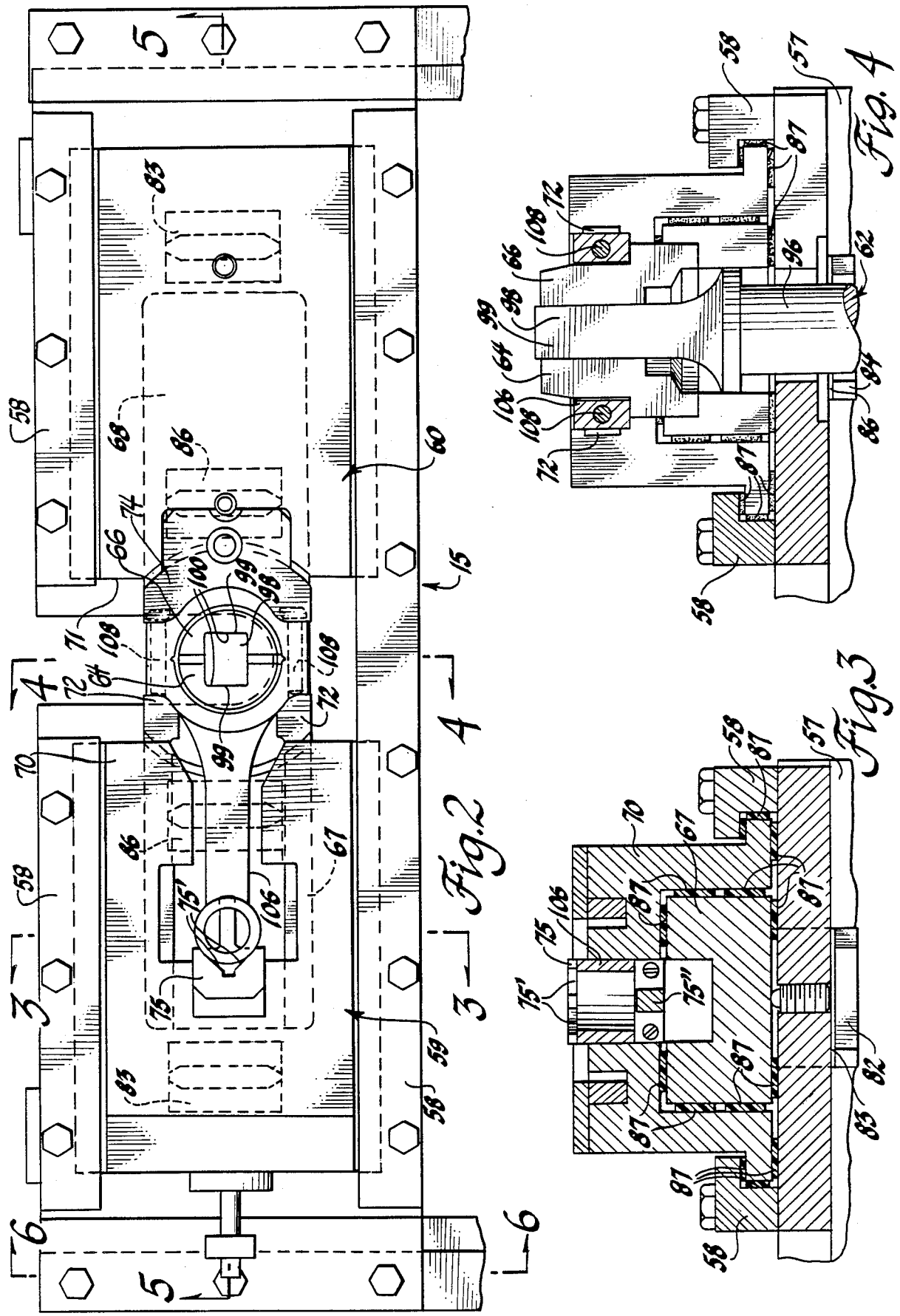

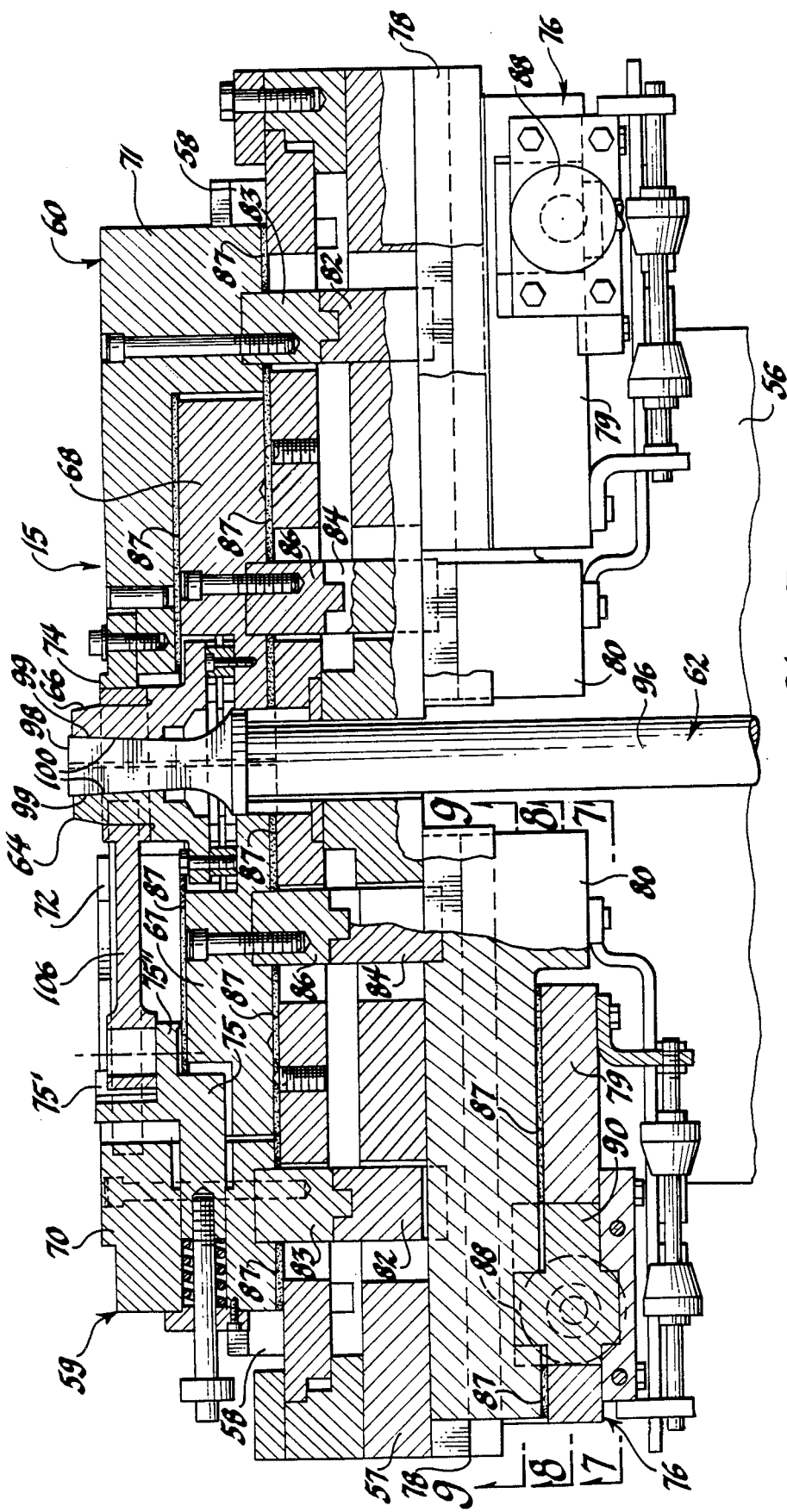

CONNECTING ROD FRACTURE MACHINE

TECHNICAL FIELD

This invention relates to manufacturing equipment and in particular to machines for the fracture separation of cap portions from the main bodies of the large bearing ends of integrally cast engine connecting rods and the like.

BACKGROUND

U.S. Pat. No. 4,569,109 Fetouh, assigned to the assignee of the present invention, discloses methods and means for the fracture separation of engine bearing assemblies, including connecting rods, which are integrally formed and subsequently separated into main body and bearing cap portions by fracture separation of the large bearing end.

In continuing the practical development of the method disclosed in U.S. Pat. No. 4,569,109, it was desired to provide a machine for automatically processing a substantial volume of engine connecting rods through the fracture separation process in a manner that would provide a high quality fracture with little or no manual assistance.

SUMMARY OF THE INVENTION

The present invention provides an automatic connecting rod fracture machine capable of the fracture separation of substantial numbers of connecting rods in a production environment.

The machine includes cryogenic cooling means for initially reducing the temperature of the connecting rod's large bearing ends to a low level with a cryogenic liquid. This "freeze cooling" allows the fracture separation of connecting rods which may be forged, cast or made with powdered metal of materials that would be excessively ductile at room temperatures to permit satisfactory fracture separation.

The freezing embrittles the metal and reduces the need for the use of hardenable materials and heat treatment in the manufacture of the connecting rods. Nevertheless, hardenable materials and heat treatments to control grain size and the like may be used with the present machine if desired.

The machine further includes transfer means for transferring the connecting rods from the cooling tank to a fracture station and, after fracture, to a heating tank where the rods are warmed to room temperature for further processing. The fracture station includes impact means for causing rapid separation of the connecting rod body and cap members and clamping means which allow the portions of the integral connecting rod blank to be fractured and pulled apart without permitting substantial rotation of the main body and cap portions relative to one another. This avoids bending of the material at one side of the legs in the split planes, as is taught in U.S. Pat. No. 4,569,109. The fracture station portion of the machine could be operated without using the cooling and heating portions if the materials selected were sufficiently brittle to be cleanly fractured without "freezing".

While the method performed by the present machine simultaneously tensions and might appear to break both legs of a connecting rod cap and body at the same moment, it is believed inherent in the method and means for fracture separation that one side of the connecting rod cap will fracture before the other. Thereafter, upon fracturing of the first side of the connecting rod, the clamping arrangement maintains the separated pair of legs in substantially their mated positions until fracture separation of the other side, or pair of legs, is completed.

Therefore, even though the present method is conducted in a continuous and seemingly instantaneous manner, it is considered that the method followed inherently carries out the claimed method of U.S. Pat. No. 4,569,109. In addition, certain novel features of the present method are disclosed and claimed in copending U.S. patent application Ser. No. 085,687 filed concurrently with the application for this patent and assigned to the assignee of the present invention.

These and other features and advantages of the invention will be more fully understood from the following description of a preferred embodiment of the invention taken together with the accompanying drawings.

BRIEF DRAWING DESCRIPTION

In the drawings:

FIG. 2 is a top view of a fracture station of the machine from the plane indicated by the line 2—2 of FIG. 1;

FIG. 3 is a transverse cross-sectional view through a portion of the fracture station at the plane indicated by the line 3—3 of FIG. 2;

FIG. 4 is a transverse cross-sectional view through the center portion of the fracture station at the plane indicated by the line 4—4 of FIG. 2;

FIG. 5 is a longitudinal cross-sectional view through the upper part of the fracture station at the plane indicated by the line 5—5 of FIG. 2;

DETAILED DESCRIPTION

Figure 1:
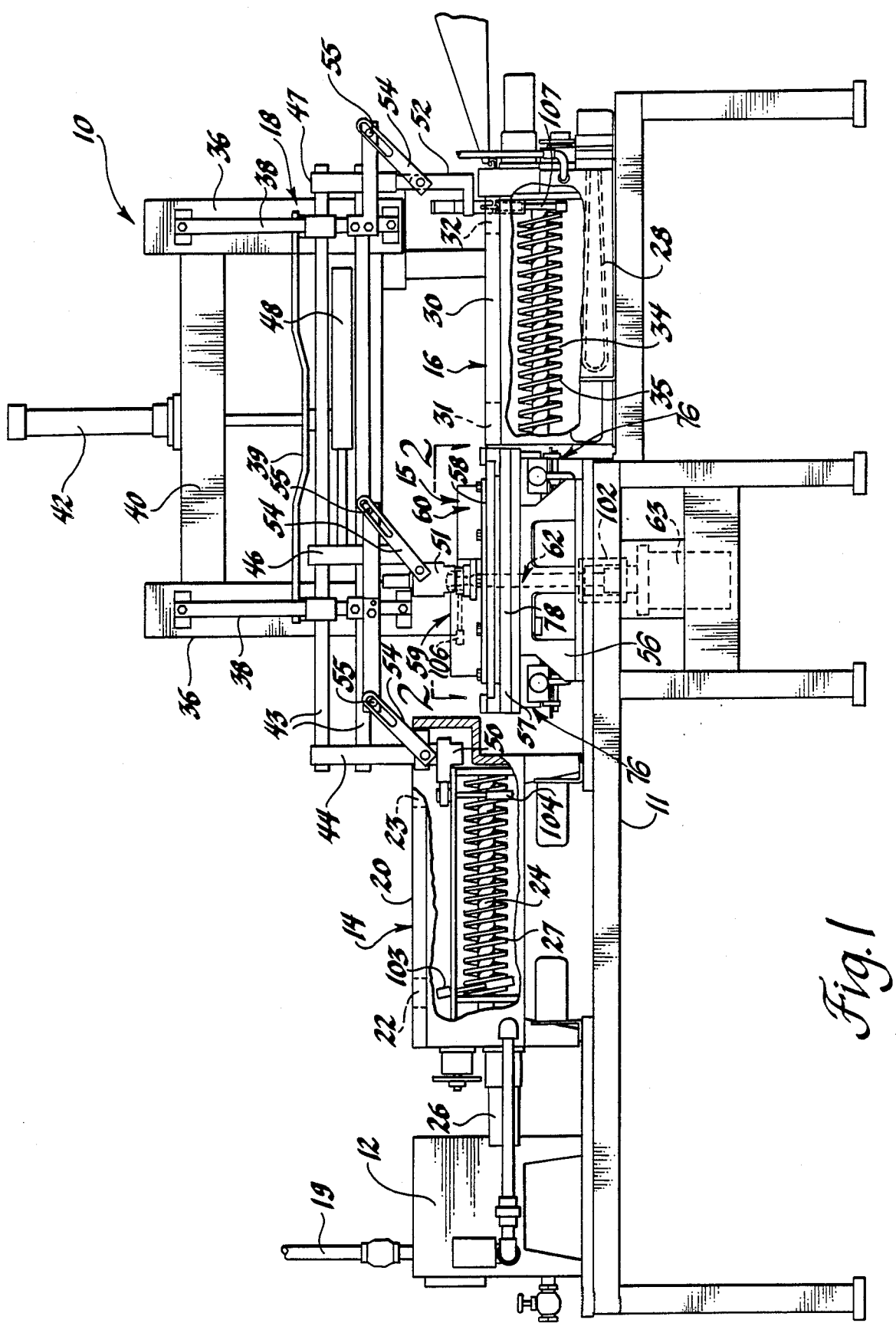
FIG. 1 is a side view of an automatic connecting rod fracture machine formed in accordance with the invention.
Figure 6:
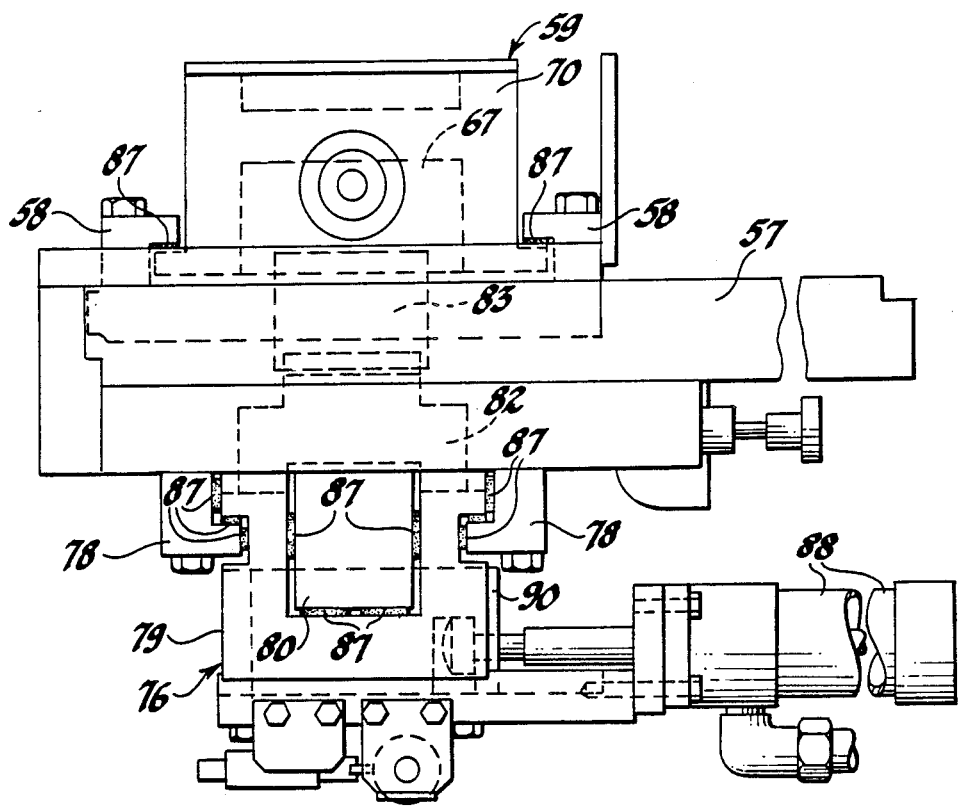
FIG. 6 is an end view of the fracture station from the plane indicated by the line 6—6 of FIG. 2.
Figure 7:
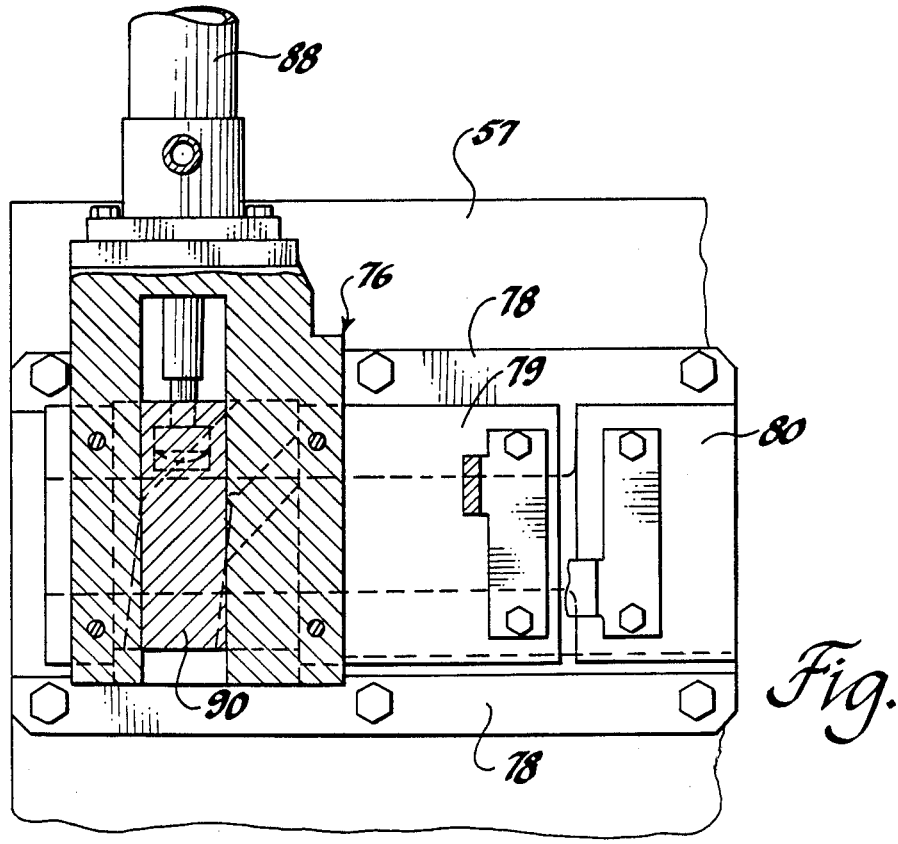
FIG. 7 is an upward cross-sectional view of one of the clamping mechanisms from the plane indicated by the line 7—7 of FIG. 5.
Figure 8:
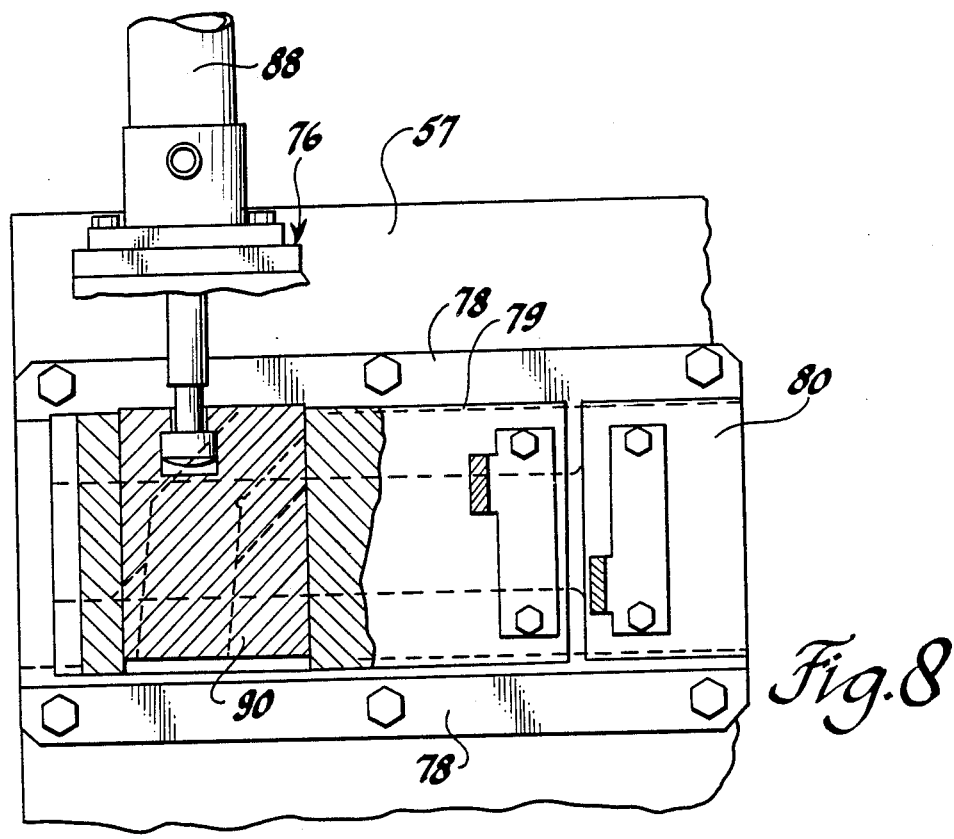
FIG. 8 is an upward cross-sectional view of the same clamping mechanism from the plane indicated by the line 8—8 of FIG. 5
Figure 9:
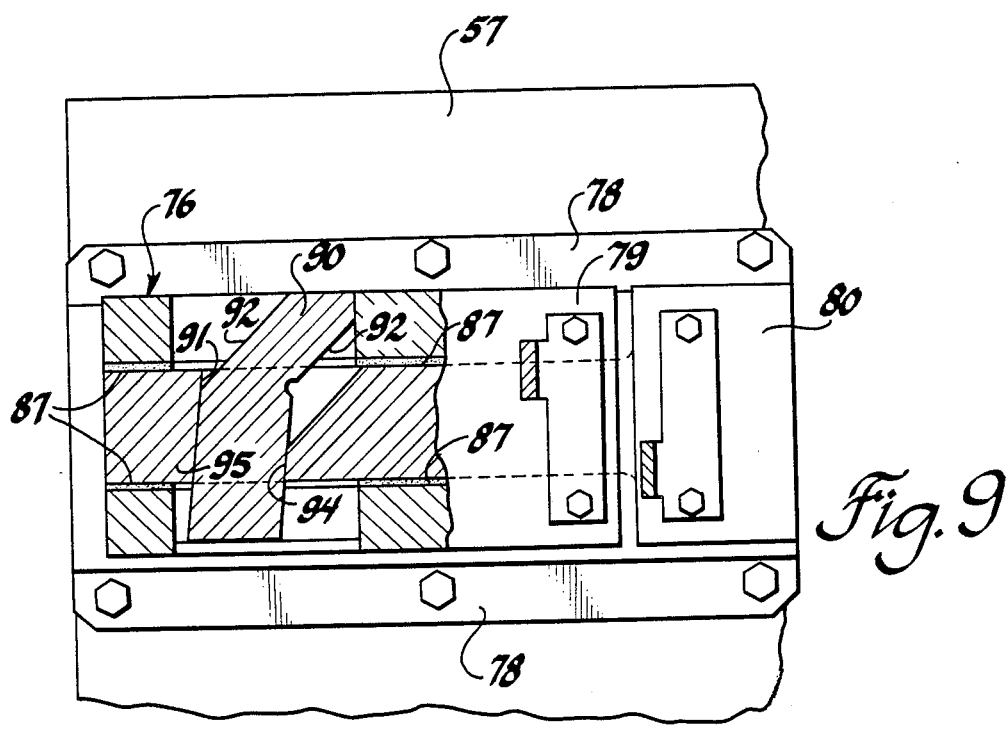
FIG. 9 is an upward cross-sectional view of the same clamping mechanism from the plane indicated by the line 9—9 of FIG. 5.

Referring now to the drawings in detail, numeral 10 generally indicates an automatic connecting rod fracture machine formed in accordance with the invention. Machine 10 includes, in general, a supporting base or table 11 on which there is carried a liquid nitrogen storage tank 12 connected with a cooling tank 14. Adjacent to the cooling tank is a fracture station 15. Beyond the fracture station is a warming tank 16, the three tanks and the fracture station being arranged in linear fashion on the table 11. Above the fracture station and the cooling and warming tanks is a transfer mechanism 18 for moving connecting rods sequentially from the cooling tank, to the fracture station, to the warming tank, and to a storage or transfer device, not shown.

The nitrogen tank 12 is fed through a supply line 19 with cryogenic liquid nitrogen and contains a supply adequate to maintain a level in the adjacent cooling tank 14 preferably high enough to fully submerge the large ends of connecting rods placed within the cooling tank.

The cooling tank 14 includes a cover 20 having placement and withdrawal openings 22, 23 respectively, for placing connecting rods in and withdrawing connecting rods from the liquid nitrogen in the cooling tank. Internally, the tank 14 includes a single screw transfer auger 24 driven by a motor 26 through gear means, not shown. The auger 24 has a helical blade 27 defining a series of spaces in which connecting rods may be sequentially inserted through the opening 22, carried forward through the cooling tank to the opposite end and removed sequentially through the withdrawal opening 23.

The warming tank 16 differs from the cooling tank in that it contains a suitable heating liquid, such as ethylene glycol or water containing soluble oil, maintained at a suitable temperature at or above ambient by an immersion heater 28 located within the bottom of the tank 16. Otherwise, the heating tank is similar to the cooling tank in that it contains a cover 30 with placement and withdrawal openings 31 and 32 respectively and a transfer auger 34 with a helical blade 35 for carrying fractured connecting rod assemblies from one end of the tank to the other while warming the assemblies to approximately room temperature.

The transfer mechanism 18 includes a pair of table mounted pedestals 36 carrying vertical guides 38 on which a carrier beam 39 is vertically movable. A support beam 40, extending between the pedestals 36, carries a hydraulic cylinder 42 which is connected with the carrier beam to control its vertical position in accordance with the requirements of suitable control means, not shown.

The carrier beam 39 supports a pair of longitudinally movable carrier rods 43. On these rods 43 are mounted three transfer heads 44, 46, 47 to form an assembly, the longitudinal location of which is movable between pickup and discharge positions by a hydraulic cylinder 48 mounted on the carrier beam 39 and connected with the transfer head 46.

The transfer heads 44, 46, 47 respectively carry gripping fixtures 50, 51, 52 which are operatable to grasp and transfer the connecting rod work pieces. The angular positions of the three gripping fixtures are turned 90° during their longitudinal transfer motion by levers 54 which slidingly engage pivot pins 55 supported by the carrier beam 39. In FIG. 1, the transfer mechanism 18, including the transfer head and rod assembly and the gripping fixtures 50, 51, 52, is shown in the pickup position.

The fracture station 15, best shown in FIGS. 2-9 is located between the cooling tank 14 and the warming tank 16 and includes a base 56 carrying a fixed support 57 on which are supported stationary ways 58. The ways carry, for limited longitudinal motion thereon, a pair of longitudinally spaced clamp assemblies including a body clamp assembly 59 and a cap clamp assembly 60. Between the clamp assemblies there is carried a fracture ram generally indicated by numeral 62 and actuated by an air cylinder 63 carried in supporting structure below the table 11.

The clamp assemblies 59, 60 respectively include semi-circular pilots 64, 66 which are respectively secured to tongues 67, 68. These are slideably supported on the ways 58 and respectively received within recesses of clamp supports 70, 71, also carried by the ways 58 and longitudinally movable thereon.

Clamp support 70 also carries a pair of body clamp elements 72 fixedly secured to the support 70 and adapted to cooperate with the pilot 64 to nonrotatably clamp the body of a connecting rod work piece in the clamp assembly 59. Similarly, the cap clamp support 71 fixedly carries a cap clamp element 74 which cooperates with the pilot 66 to nonrotatably clamp the cap portion of a connecting rod work piece in the cap clamp assembly 60. In addition, the body clamp support 70 also includes a spring loaded guide element 75 having V-shaped jaws 75' and a supporting extension 75" engageable with the small end of a connecting rod work piece to align the connecting rod in the clamp assemblies prior to engagement of the clamp elements 72, 74 with their respective body and cap portions.

To actuate the clamp elements 72, 74, clamp supports 70, 71, pilots 64, 66 and tongues 67, 68, the clamp assemblies 59, 60 also include like actuating portions generally indicated by numeral 76. Actuating portions 76 are each carried on additional longitudinal ways 78 mounted under the fixed support 56 and include a clamp actuator 79 and a pilot actuator 80.

The clamp actuators 79 are slideably retained in the ways 78 and are keyed to the body and cap clamp supports 70, 71 by interlocking driver elements 82, 83 secured to the clamp actuators 79 and clamp supports 70, 71 respectively, so that the clamp actuators 79 and their respectively associated clamp supports 70, 71 move longitudinally together in their respective ways 78, 58. The driver elements 82, 83 extend through openings in the support 57 and ways 58 which may be utilized to limit the amount of longitudinal motion permitted of the clamp supports 70, 71.

Similarly, the pilot actuators 80 are drivingly connected for longitudinal motion with their respective pilots 64, 66 through interlockingly connected driver elements 84, 86 which are respectively connected with their associated pilot actuators 80 and pilot tongues 67, 68. Teflon based bearing tapes 87 are preferably used to lubricate the longitudinal sliding motions of the tongues, supports and actuators in their respective ways, although any other suitable form of lubrication could be utilized if desired.

Each of the actuating portions 76 further includes clamp actuating means including a hydraulic cylinder 88 carried by its clamp actuator 79 and drivingly connected with a cam block 90 that has a compound cam including both 7° and 45° angled surfaces 91, 92 engageable with similarly angled surfaces 94, 95 respectively, of the associated pilot actuator 80.

The fracture ram 62 of the fracture station 15 includes a vertically movable actuating rod 96 having at its upper end a wedge 98 with longitudinally opposite angled sides 99 engageable with similarly angled sides 100 of the pilots 64, 66. A lost motion coupling 102 (FIG. 1) connects the actuating rod 96 of the fracture ram 62 with the air cylinder 63.

Additionally shown in the drawings at various locations representative of their positions during operation of the fracture machine are connecting rod workpieces 103, 104, 106, and 107. It should, however, be understood that in actual operation, additional connecting rods would be located within the heating and cooling tanks of the machine for processing therein. They are omitted here to aid visualization of the machine components.

In operation of the fracture machine embodiment previously described, integrally formed connecting rod workpieces are inserted into the cooling tank 14 through the placement opening 22 by manual means or by automatic means, such as a robot or conveyer, not shown. The workpieces are placed with their large ends down, as is shown by the connecting rod workpiece 103. The cooling tank 14 is filled with liquid nitrogen, or other suitable low temperature liquid, to a level adequate to cover and cause embrittlement of the connecting rod large ends while the workpieces are being transferred, by rotation of the auger 24, from one end of the cooling tank to the other.

At the other end, illustrated by the position of workpiece 104, the connecting rods are grasped by the gripping fixture 50 when the transfer mechanism is in the pickup position shown in the drawings. The transfer mechanism 18 is then advanced by, first, raising the carrier beam 39 with the cylinder 42 so as to lift the gripping fixture 50 and workpiece 104 out of the cooling tank 14.

The carrier rods 43 and transfer heads 44, 46, 47 are then translated longitudinally toward the right, as viewed in FIG. 1, causing the gripping fixture 50 to move toward the right and rotate 90°. The connecting rod workpiece 104 is, thus, turned to a horizontal position with the big end toward the right of the figure. The carrier beam 39 is then lowered by actuating the cylinder 42 and the transferred connecting rod is placed in the transfer station, in the position indicated by connecting rod workpiece 106, with the large end opening positioned around the pilots 64, 66 and the small end supported on the horizontal extension 75" of the guide element 75.

The clamp cylinders 88 are then actuated, causing the cam blocks 90 in each of the actuating portion 76 to drive inwardly the body and cap clamp supports 70, 71, respectively, until the clamp elements 72, 74 engage the body and cap portions, respectively, of the connecting rod large end. This clamps the body and cap to prevent substantial subsequent rotation of either of these elements during the remaining processing. Prior to seating of the body clamp elements 72, the jaws 75' of the spring loaded guide element 75 are urged into engagement with the small end of the connecting rod so as to locate the small end in a centered position as best shown in FIG. 2.

When the clamping action is complete, the air cylinder 63 is actuated downwardly, reaching a substantial velocity before engagement of the lost motion coupling 102 with the fracture ram 62. This engagement accelerates the ram downwardly with a sudden impact motion which pulls the wedge 98 rapidly downward, causing its angled sides 99 to quickly force apart the pilots 64, 66 and their associated clamp assemblies 59, 60 to which the body and cap portions of an integral connecting rod workpiece are respectively clamped. This small but rapid separating motion of the clamp assemblies is sufficient to cause fracture separation of the large end cap portion of the connecting rod from the main body portion substantially in the manner described in U.S. Pat. No. 4,569,109.

During this fracture step, the body and cap clamp assemblies 59, 60 remain locked together so as to hold their respective body and cap portions of the connecting rod in nonrotating relationship while the clamp assemblies are physically separated the small amount necessary to cause fracture separation of the connecting rod portions. In this way, the cap and body portions of the connecting rod are separated by purely linear motion and any significant bending or rotation of the cap relative to the body is prevented so that a clean fracture is obtained.

It should be noted that the fracture operation is carried out in a rapid manner after the connecting rod is removed from the cooling tank so that the embrittled connecting rod large end does not have time to warm up to a temperature at which its brittle condition is impaired.

It is preferable if the connecting rod members provided for fracture separation have been previously drilled and tapped for the installation of cap retaining machine screws 108 (shown in FIG. 4) and if the machine screws are installed in loose threaded engagement to retain the separated cap portion together with the main body portion but allow the separation step to take place. Of course, other cap attaching means could be used instead, such as conventional bolt and nut assemblies with the bolts and nuts loosely attached to allow fracture separation of the caps. Further it is desirable if the interior of the machined connecting rod large end bore is notched at the split line as described in U.S. Pat. No. 4,569,109 for the purpose of aiding the formation and positioning of the fracture.

After completion of the fracture separation step, the air cylinder 63 returns the fracture ram to the initial position shown in the figures and the hydraulic cylinders 88 retract the cam blocks 90 to move clamp elements 72, 74 and the guide element 75 away from the body and cap so as to free the separated connecting rod portions for removal. This action moves the clamp supports outwardly, first with a slow action by means of the 7° angled surfaces and subsequently with a faster action by means of the 45° angled surfaces while, at the same time, urging the tongues 67, 68 inwardly to return the pilots 64, 66 to their initial positions against the wedge 98.

Thereafter, the transfer mechanism 18 is moved in reverse fashion back to the initial position illustrated in the drawings wherein the gripping fixture 51 engages the separated connecting rod portions for transfer. Repeat actuation of the transfer mechanism then lifts the connecting rod and its separated cap, which is still retained by cap screws or the gripping fixture, and moves the connecting rod rightwardly while turning it 90° and then lowers the connecting rod into the warming tank through the opening 31.

Continued operation of the machine allows the auger 34 to carry the separated but screw retained connecting rod portions along the length of the warming tank 16 while the heated liquid therein warms the previously cooled connecting rod up to approximately room temperature. When the connecting rod reaches the other end of the warming tank, as shown by the position of the connecting rod 107, movement of the transfer mechanism 18 to the pickup position shown in the drawings causes the gripping fixture 52 to engage the connecting rod large end. The separated rod assembly is then lifted out of the warming tank upon actuation of the transfer mechanism and moved to the right while being turned 90° for placement onto a storage or transfer device, not shown.

While the invention has been described by reference to a preferred embodiment, it should be understood that numerous changes could be made within the spirit and scope of the inventive concepts described. Accordingly it is intended that the invention not be limited to the disclosed embodiments, but that it have the full scope permitted by the language of the following claims.

We claim:

The embodiments of the invention in which an exclusive property or privilege is claimed are defined as follows:

1. A connecting rod fracture machine for fracture separating the caps and bodies of integrally formed connecting rod blanks, said machine comprising
   a cooling station including a tank of cryogenic liquid for lowering the temperature of connecting rod blanks to effect embrittlement thereof,
   a fracture station including a pair of separable pilots for receiving the large end bores of connecting rod blanks, separation means for moving the pilots linearly away from one another without substantial rotation to effect fracture separation of the caps and bodies, and clamp means associated with each of the pilots for maintaining the caps and bodies in fixed relation with their respective pilots during separation to require substantially linear separating motion of the caps from the bodies,
   a warming station including a tank of heated liquid for raising the temperatures of the separated caps and bodies to near ambient temperature for further handling or storage, and
   transfer means for carrying connecting rod blanks from the cooling station to the fracture station and for carrying fracture separated connecting rod cap and rod assemblies from the fracture station to the warming station and out of the warming station.

2. A connecting rod fracture machine as in claim 1 wherein
   said cooling and warming tank advancing means comprise rotatable augers having helical blades defining connecting rod receiving spaces which advance through their respective tanks upon rotation of the augers.

3. A connecting rod fracture machine for fracture separating caps and bodies of integrally formed connecting rod blanks, said machine comprising
   a cooling station including a cooling tank of cryogenic liquid for lowering the temperature of the connecting rod blanks to effect embrittlement thereof, said cooling tank incorporating advancing means for moving the blanks sequentially from a loading position along a liquid covered path within the tank to an unloading position,
   a fracture station including a pair of separable pilots for receiving the large end bores of connecting rod blanks, impact separation means for rapidly moving the pilots linearly away from one another to effect fracture separation of the caps and bodies, and anti-rotation clamp means associated with each of the pilots for maintaining the caps and bodies in fixed relation with their respective pilots during separation to require substantially linear separating motion of the caps from the bodies,
   a warming station including a warming tank of heated liquid for raising the temperatures of the separated caps and bodies to near ambient for further handling or storage, said warming tank incorporating advancing means for moving the blanks sequentially from a loading position along a liquid covered path within the tank to an unloading position, and
   transfer means for carrying connecting rod blanks from the cooling station to the fracture station and for carrying fracture separated connecting rod cap and rod assemblies from the fracture station to the warming station and out of the warming station.

4. A connecting rod fracture machine as in claim 3 wherein
   said cooling and warming tank advancing means comprise rotatable augers having helical blades defining connecting rod receiving spaces which advance through their respective tanks upon rotation of the augers, and
   said fracture station impact separation means includes a wedge engageable with the pilots for separating movement thereof and actuated by translating means connected with the wedge through a lost motion coupling to provide impact motion of the wedge during operation of the translating means.

5. A connecting rod fracture machine for fracture separating the caps and bodies of integrally formed connecting rod blanks, said machine comprising
   a stationary frame,
   a pair of separable pilots mounted for essentially linear motion on the frame and having surfaces for receiving and engaging opposite portions of the large end bores of connecting rod blanks,
   anti-rotation clamp means associated with each of the pilots and mounted for linear motion therewith on the frame, said clamp means, when clamped, maintaining the caps and bodies in fixed relation with their respective pilots during separation to require substantially linear separating motion of the caps from the bodies, and
   impact separation means for rapidly moving the pilots linearly away from one another to effect fracture separation of the caps and bodies.

6. A connecting rod fracture machine as in claim 5 wherein said impact separation means includes a wedge engageable with the pilots for separating movement thereof and actuated by translating means connected with the wedge through a lost motion coupling to provide impact motion of the wedge during operation of the translating means.

7. A connecting rod fracture machine for fracture separating the caps and bodies of integrally formed connecting rod blanks, said machine comprising
   a frame,
   a pair of separable pilots, at least one mounted for essentially linear motion on the frame, the pilots having surfaces for receiving and engaging opposite portions of the large end bores of connecting rod blanks,
   anti-rotation clamp means associated with each of the pilots, said clamp means, when clamped, maintaining the caps and bodies in fixed relation with their respective pilots during separation to require substantially linear separating motion of the caps from the bodies, and
   separation means for moving said at least one pilot linearly away from the other to effect fracture separation of the caps and bodies.

* * * * *